United States Patent
Shafin et al.

(10) Patent No.: US 12,382,386 B2
(45) Date of Patent: Aug. 5, 2025

(54) RESTRICTED TWT ENHANCED INFORMATION ADVERTISEMENT PROCEDURE FOR NEXT GENERATION WLAN

(71) Applicant: Samsung Electronics Co., Ltd., Suwon-si (KR)

(72) Inventors: Rubayet Shafin, Allen, TX (US); Boon Loong Ng, Plano, TX (US); Peshal Nayak, Plano, TX (US); Ahmed Atef Ibrahim Ibrahim, Plano, TX (US); Vishnu Vardhan Ratnam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/052,815

(22) Filed: Nov. 4, 2022

(65) Prior Publication Data

US 2023/0115377 A1    Apr. 13, 2023

Related U.S. Application Data

(63) Continuation of application No. 17/817,971, filed on Aug. 5, 2022.

(Continued)

(51) Int. Cl.
*H04W 4/00* (2018.01)
*H04W 52/02* (2009.01)
*H04W 84/12* (2009.01)

(52) U.S. Cl.
CPC ........ *H04W 52/0206* (2013.01); *H04W 84/12* (2013.01)

(58) Field of Classification Search
CPC .............. H04W 52/0206; H04W 84/12; Y02D 30/70
See application file for complete search history.

(56) References Cited

U.S. PATENT DOCUMENTS

| 2018/0192444 A1 | 7/2018 | Park et al. |
| 2020/0221545 A1 | 7/2020 | Stacey et al. |

(Continued)

OTHER PUBLICATIONS

IEEE P802.11be-D0.4 "Part 11: Wireless LAN Medium Access Control (MAC) and Physical Layer (PHY) Specifications—Amendment 8: Enhancements for extremely high throughput (EHT)" Mar. 2021, 511 pgs.
Extended European Search Report for EP 22858723.4 by European Patent Office dated Jul. 16, 2024.
IEEE P802.11be/D1.0 "Extremely high throughput (EHT) MAC specification," IEEE. May 2021.

(Continued)

*Primary Examiner* — Omoniyi Obayanju
(74) *Attorney, Agent, or Firm* — BROADVIEW IP LAW, PC

(57) ABSTRACT

Methods and apparatuses for enhancing advertisement of restricted target wake time (TWT) schedules by access points (APs) and improving selection of restricted TWT schedules by stations (STAs) in a wireless local area network. A wireless STA apparatus comprises a transceiver and a processor operably coupled to the transceiver. The transceiver is configured to receive, from an AP, a restricted TWT advertisement that includes a restricted TWT schedule and additional information about the restricted TWT schedule. The processor is configured to determine, based on the additional information, whether to refrain from requesting to become a member of the restricted TWT schedule.

18 Claims, 13 Drawing Sheets

Related U.S. Application Data

(60) Provisional application No. 63/307,899, filed on Feb. 8, 2022, provisional application No. 63/285,357, filed on Dec. 2, 2021, provisional application No. 63/283,859, filed on Nov. 29, 2021, provisional application No. 63/275,292, filed on Nov. 3, 2021, provisional application No. 63/235,501, filed on Aug. 20, 2021.

(56) References Cited

U.S. PATENT DOCUMENTS

| | | |
|---|---|---|
| 2021/0212156 A1 | 7/2021 | Kwon et al. |
| 2022/0330149 A1* | 10/2022 | Hu .................. H04L 1/1614 |
| 2023/0047705 A1* | 2/2023 | Xin .................. H04W 74/0808 |

OTHER PUBLICATIONS

IEEE P802.11be/D1.0 "Part 11: Wireless LAN Medium Access Control (MAC) and Physical Layer (PHY) Specifications Amendment 8: Enhancements for extremely high throughput (EHT)", Draft Standard for Information Technology, May 2021.
Hu, Chunyu et al. "Restricted TWT Spec Text Restricted TWT Announcement," IEEE 802.11-21/462. Jul. 2021.
International Search Report for PCT/KR2022/012217 by Korean Intellectual Property Office dated Nov. 21, 2022.
Chunyu Hu et al., 'Restricted TWT', IEEE 802.11-21/142r9, Mar. 4, 2021.
Muhammad Kumail Haider et al., 'CC36 CR for Restricted TWT Setup', IEEE 802.11-21/1224r3, Aug. 12, 2021.

* cited by examiner

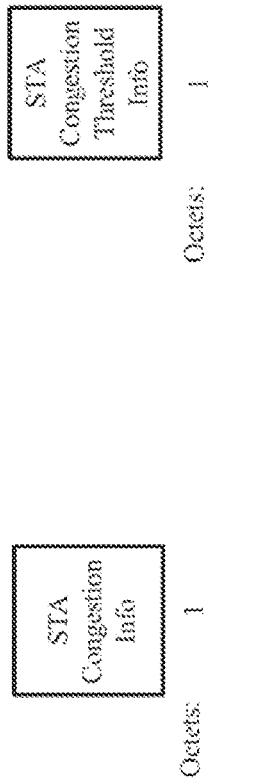
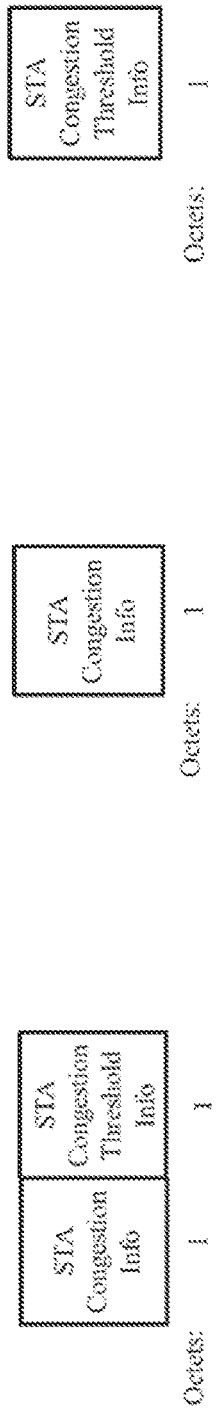
FIG. 3A
FIG. 3B
FIG. 3C
FIG. 3D

FIG. 4A

| Request Type | Target Wake Time | Nominal Minimum TWT Wake Duration | TWT Wake Interval Mantissa | Broadcast TWT Info | Restricted TWT Traffic Info (Optional) | Restricted TWT Enhanced Info (Optional) |
|---|---|---|---|---|---|---|
| 2 | 2 | 1 | 2 | 2 | 0 or 3 | variable |

Octets

FIG. 4B

| Length | rTWT Enhanced Info Control | rTWT Enhanced Info |
|---|---|---|
| 1 | 2 | variable |

Octets

FIG. 4C

| B0 | B1 | B2 | B3 | B4 | B5 | B6 | B7 |
|---|---|---|---|---|---|---|---|
| Congestion Info Present | Delay Info Present | Mean Data Rate Info Present | Peak Data Rate Info Present | Burst Size Info Present | Minimum PHY Rate Info Present | Congestion Threshold Info Present | Reserved |
| 1 | 1 | 1 | 1 | 1 | 1 | 1 | 1 |

Bits

| Congestion Info | Delay Info | Mean Data Rate Info | Peak Data Rate Info | Burst Size Info | Minimum PHY Rate Info | Congestion Threshold Info |
|---|---|---|---|---|---|---|
| 0 or 1 | 0 or 4 | 0 or 4 | 0 or 4 | 0 or 4 | 0 or 4 | 0 or 1 |

Octets:

FIG. 4D

| B0 | B1 | B2 B7 | B8 B15 |
|---|---|---|---|
| Restricted TWT Traffic Info Present | Restricted TWT Enhanced Info Present | Reserved | Broadcast TWT ID | Broadcast TWT Persistence |
| 1 | 1 | 1 | 5 | 8 |

Bits:

FIG. 4E

| B0 | B1 B3 | B4 | B5 | B6 | B7 B9 | B10 B14 | B15 |
|---|---|---|---|---|---|---|---|
| TWT Request | TWT Setup Command | Trigger | Last Broadcast Parameter Set | Flow Type | Broadcast TWT Recommendation | TWT Wake Interval Exponent | rTWT Enhanced Info Present |
| 1 | 3 | 1 | 1 | 1 | 3 | 5 | 1 |

Bits:

FIG. 4F

| B0 | B1 | B2 | B3 B7 | B8 B15 |
|---|---|---|---|---|
| Restricted TWT Traffic Info Present | Restricted TWT Schedule Full | Reserved | Broadcast TWT ID | Broadcast TWT Persistence |
| Bits: 1 | 1 | 1 | 5 | 8 |

FIG. 8A

| B0 | B1 | B2 | B3 B7 | B8 B15 |
|---|---|---|---|---|
| Restricted TWT Traffic Info Present | Reserved | Restricted TWT Schedule Full | Broadcast TWT ID | Broadcast TWT Persistence |
| Bits: 1 | 1 | 1 | 5 | 8 |

FIG. 8B

| B0 | B1 B3 | B4 | B5 | B6 | B7 B9 | B10 B14 | B15 |
|---|---|---|---|---|---|---|---|
| TWT Request | TWT Setup Command | Trigger | Last Broadcast Parameter Set | Flow Type | Broadcast TWT Recommendation | TWT Wake Interval Exponent | rTWT Schedule Full |
| Bits: 1 | 3 | 1 | 1 | 1 | 3 | 5 | 1 |

FIG. 9

RESTRICTED TWT ENHANCED INFORMATION ADVERTISEMENT PROCEDURE FOR NEXT GENERATION WLAN

CROSS-REFERENCE TO RELATED APPLICATION(S) AND CLAIM OF PRIORITY

This application is a continuation of U.S. application Ser. No. 17/817,971 filed on Aug. 5, 2022, which claims priority under 35 U.S.C. § 119(e) to U.S. Provisional Patent Application No. 63/235,501 filed on Aug. 20, 2021, U.S. Provisional Patent Application No. 63/275,292 filed on Nov. 3, 2021, U.S. Provisional Patent Application No. 63/283,859 filed on Nov. 29, 2021, U.S. Provisional Patent Application No. 63/285,357 filed on Dec. 2, 2021, and U.S. Provisional Patent Application No. 63/307,899 filed on Feb. 8, 2022, which are hereby incorporated by reference in their entirety.

TECHNICAL FIELD

This disclosure relates generally to power saving in wireless communications systems. Embodiments of this disclosure relate to methods and apparatuses for enhancing advertisement of restricted target wake time schedules by scheduling access points and improving selection of restricted target wake time schedules by scheduled stations in a wireless local area network communications system.

BACKGROUND

Wireless local area network (WLAN) technology allows devices to access the internet in the 2.4 GHz, 5 GHz, 6 GHz or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Target Wake Time (TWT) is one of the important features for power management in WI-FI networks, which was developed by IEEE 802.11ah and later adopted and modified into IEEE 802.11ax. TWT enables wake time negotiation between an AP and an associated station (STA) for improving power efficiency. With TWT operation, it suffices for a STA to only wake up at a pre-scheduled time negotiated with another STA or AP in the network. In IEEE 802.11ax standards, two types of TWT operation are possible—individual TWT operation and broadcast TWT operation. Individual TWT agreements can be established between two STAs or between a STA and an AP. On the other hand, with broadcast TWT operation, an AP can set up a shared TWT session for a group of STAs.

The negotiated parameters such as the wake interval, wake duration and initial wake time (offset) highly affect latency, throughput as well as power efficiency, which are directly related to QoS (quality of service) or customer experiences. Services with different traffic characteristics will have different TWT parameter configurations for better QoS. Additionally, the TWT configuration should adapt to network and service status variation.

Restricted TWT (rTWT) operation, which is based on broadcast TWT operation, is a feature introduced with a view to providing better support for latency sensitive applications. Restricted TWT offers a protected service period for its member STAs by sending Quiet elements to other STAs in the basic service set (BSS) which are not members of the restricted TWT schedule, where the Quiet interval corresponding to the Quiet element overlaps with the initial portion of the restricted TWT service period (SP). Hence, it gives more channel access opportunity for the restricted TWT member scheduled STAs, which supports latency-sensitive traffic flow. There are some key characteristics that make restricted TWT operation an important feature for supporting low-latency applications in next generation WLAN systems

SUMMARY

Embodiments of the present disclosure provide methods and apparatuses for enhancing advertisement of restricted TWT schedules by scheduling APs and improving selection of restricted TWT schedules by scheduled STAs in a wireless network (e.g., a WLAN).

In one embodiment, a wireless STA device is provided, comprising a transceiver and a processor operably coupled to the transceiver. The transceiver is configured to receive, from an AP, a restricted TWT advertisement that includes a restricted TWT schedule and additional information about the restricted TWT schedule. The processor is configured to determine, based on the additional information, whether to refrain from requesting to become a member of the restricted TWT schedule.

In another embodiment, an AP device is provided, comprising a transceiver and a processor operably coupled to the transceiver. The processor is configured to generate a restricted TWT advertisement that includes a restricted TWT schedule and additional information about the restricted TWT schedule. The transceiver is configured to transmit, to a STA, the restricted TWT advertisement. The processor is further configured to determine, based on the additional information, whether to allow the STA to obtain membership of the restricted TWT schedule.

In another embodiment, a method performed by the wireless STA device is provided, including the steps of receiving, from an AP, a restricted TWT advertisement that includes a restricted TWT schedule and additional information about the restricted TWT schedule, and determining, based on the additional information, whether to refrain from requesting to become a member of the restricted TWT schedule.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an example format of a Restricted TWT Parameter Set field including the Restricted TWT Additional Info subfield according to various embodiments of the present disclosure;

FIG. 3B illustrates an example format of the Restricted TWT Additional Info field in the Restricted TWT Parameter Set field of FIG. 3A according to various embodiments of the present disclosure;

FIG. 3C illustrates an alternative example format of the Restricted TWT Additional Info field in the Restricted TWT Parameter Set field according to various embodiments of the present disclosure;

FIG. 3D illustrates another alternative example format of the Restricted TWT Additional Info field in the Restricted TWT Parameter Set field according to various embodiments of the present disclosure;

FIG. 4A illustrates an example Restricted TWT Parameter Set field format including the Restricted TWT Enhanced Info field according to various embodiments of the present disclosure;

FIG. 4B illustrates an example Restricted TWT Enhanced Info field format in the Restricted TWT Parameter Set field of FIG. 4A according to various embodiments of the present disclosure;

FIG. 4C illustrates an example rTWT Enhanced Info Control subfield format in the Restricted TWT Enhanced Info field in the Restricted TWT Parameter Set field according to various embodiments of the present disclosure;

FIG. 4D illustrates an example rTWT Enhanced Info subfield format in the Restricted TWT Enhanced Info field in the Restricted TWT Parameter Set field according to various embodiments of the present disclosure;

FIG. 4E illustrates an example Broadcast TWT Info subfield format including a Restricted TWT Enhanced Info Present subfield according to various embodiments of the present disclosure;

FIG. 4F illustrates an example Request Type field format including an rTWT Enhanced Info Present subfield according to various embodiments of the present disclosure;

FIG. 8A illustrates an example Broadcast TWT Info subfield format including a Restricted TWT Schedule Full subfield according to various embodiments of the present disclosure;

FIG. 8B illustrates another example Broadcast TWT Info subfield format including a Restricted TWT Schedule Full subfield according to various embodiments of the present disclosure;

FIG. 9 illustrates an example Request Type field format including an rTWT Schedule Full subfield according to various embodiments of the present disclosure;

DETAILED DESCRIPTION

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that a restricted TWT scheduling AP can advertise or announce the restricted TWT schedules in its BSS, and that during this advertisement phase, information such as congestion level of the advertised schedule (indicated via the number of STAs that currently have an active membership of the schedule), delay, mean data rate, maximum number of allowed STAs for the schedule, etc., is not carried in the corresponding Broadcast TWT element. However, such information can be crucial for a STA that intends to establish a restricted TWT schedule, to allow the STA to intelligently determine whether or not to join an advertised schedule, and which out of multiple advertised restricted TWT schedules to join. Currently, no mechanism exists to include such information in the advertised restricted TWT schedule.

Embodiments of the present disclosure further recognize that during the advertisement phase, if restricted TWT related information about the time slots between beacons are also announced, this would help STAs that intend to establish restricted TWT schedules to request appropriate restricted TWT schedule establishment.

Accordingly, embodiments of the present disclosure provide mechanisms and a framework for restricted TWT scheduling APs to provide additional information during restricted TWT schedule advertisement that would help STAs interested in establishing restricted TWT schedules to intelligently decide whether or not to join an advertised schedule, to decide which out of multiple advertised restricted TWT schedules to join, or to make intelligent requests for establishing new restricted TWT schedules for their latency-sensitive traffic.

Figure 1:
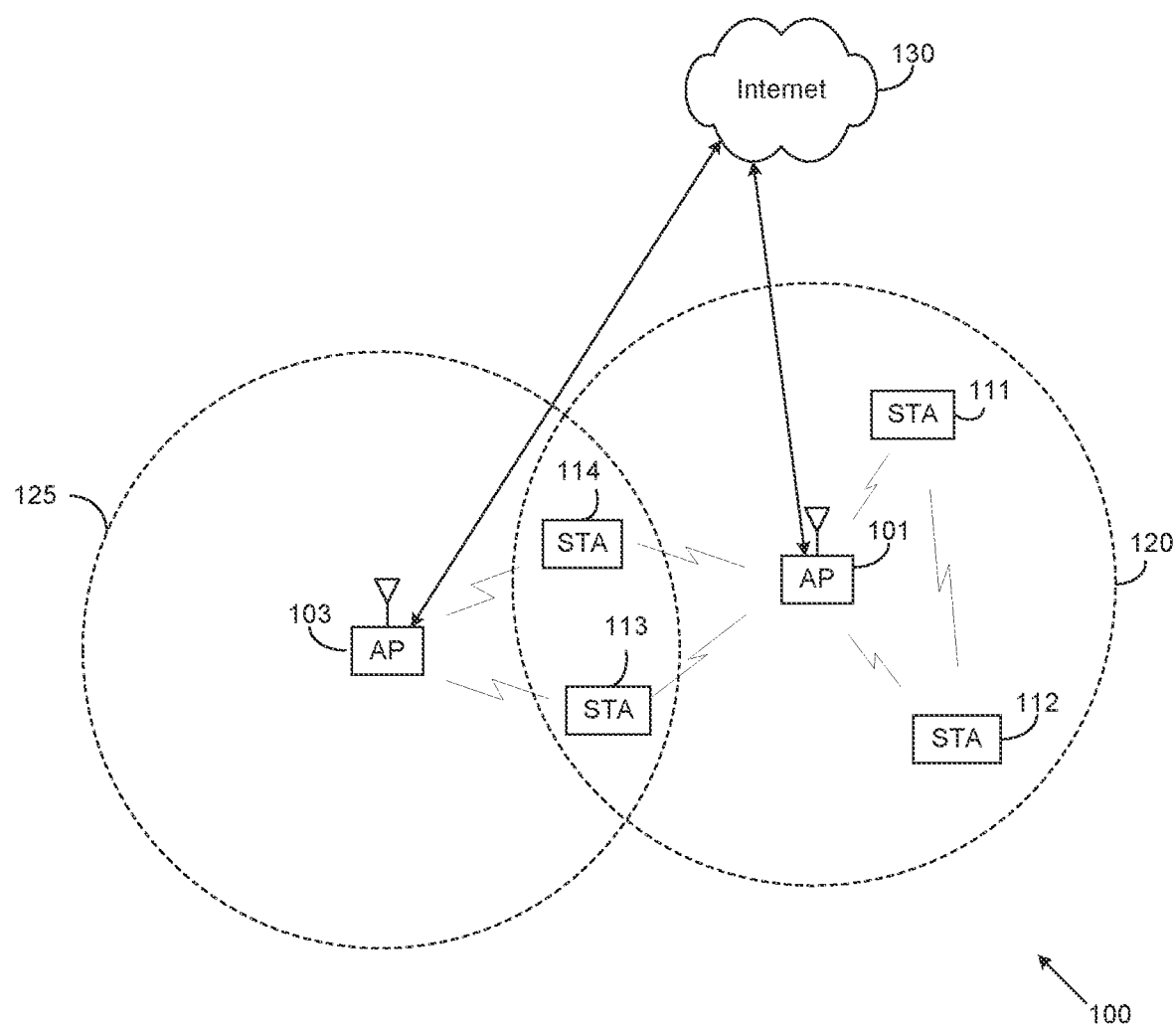
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using WI-FI or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating enhanced advertisement of restricted TWT schedules by scheduling APs and improved selection of restricted TWT schedules by scheduled STAs in a WLAN. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
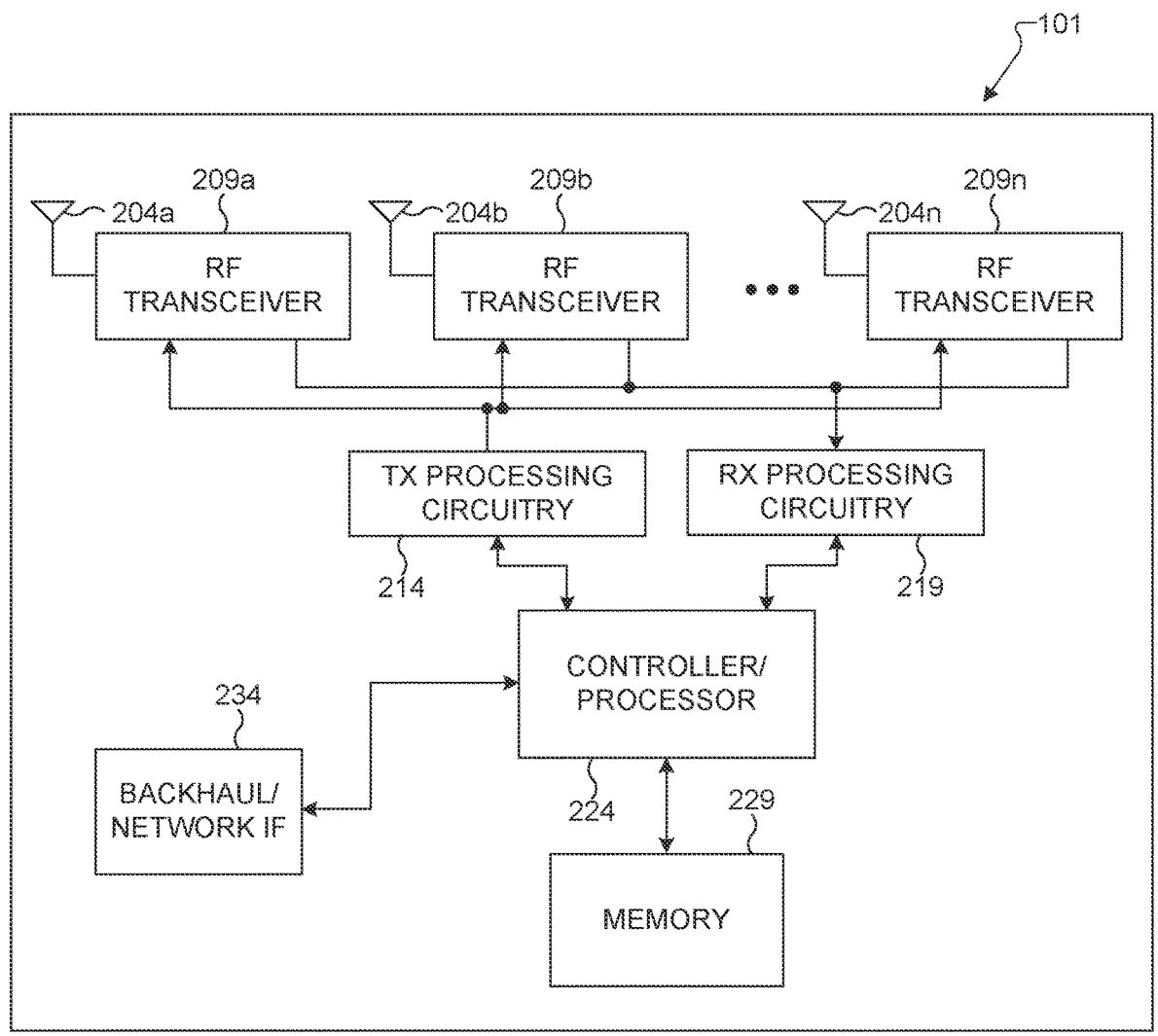
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating enhanced advertisement of restricted TWT schedules by scheduling APs and improved selection of restricted TWT schedules by scheduled STAs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating enhanced advertisement of restricted TWT schedules by scheduling APs and improved selection of restricted TWT schedules by scheduled STAs. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
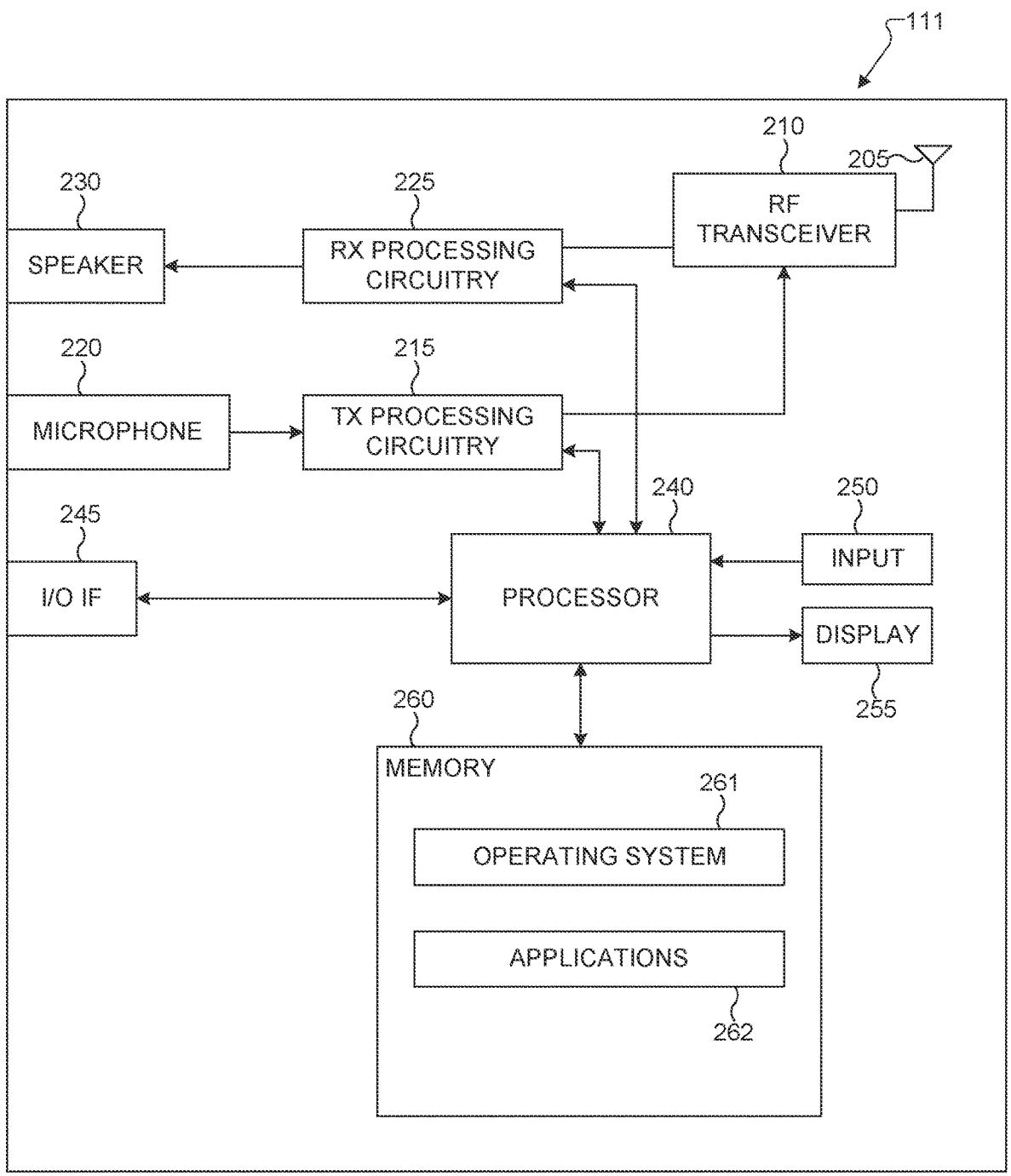
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate enhanced advertisement of restricted TWT schedules by scheduling APs and improved selection of restricted TWT schedules by scheduled STAs. In some embodiments, the controller/processor 240 includes at least one microprocessor or microcontroller.

The controller/processor 240 is also capable of executing other processes and programs resident in the memory 260, such as operations for facilitating enhanced advertisement of restricted TWT schedules by scheduling APs and improved selection of restricted TWT schedules by scheduled STAs. The controller/processor 240 can move data into or out of the memory 260 as required by an executing process. In some embodiments, the controller/processor 240 is configured to execute a plurality of applications 262, such as applications for facilitating enhanced advertisement of restricted TWT schedules by scheduling APs and improved selection of restricted TWT schedules by scheduled STAs. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

According to various embodiments of the present disclosure, during restricted TWT schedule advertisement, a restricted TWT scheduling AP can provide additional information about the corresponding restricted TWT schedule. Such information can better assist the restricted TWT scheduled STAs to prudently decide which restricted TWT schedules to join for their latency-sensitive traffic. Such information can be congestion level of a particular advertised schedule, delay of a particular restricted TWT schedule, etc.

A restricted TWT scheduled STA can utilize, in multiple ways, the additional information about the restricted TWT schedules advertised by the restricted TWT scheduling AP. The following scenario illustrates how the additional information can be helpful for a restricted TWT scheduled STA: there are two advertised restricted TWT schedules that fit the latency-sensitive traffic pattern of a STA that intends to establish a restricted TWT schedule with its associated AP. However, one of these two restricted TWT schedules has high congestion, i.e., a large number STAs have already obtained membership of the restricted TWT schedule. The other restricted TWT schedule has very low congestion. According to current standards, the restricted TWT scheduled STA wouldn't have any information about the congestion level of these two STAs, and would therefore randomly select one of the two restricted TWT schedules. However, if the restricted TWT scheduling AP could provide the congestion information of each advertised restricted TWT schedule during the restricted TWT advertisement, the STA intending to establish a restricted TWT schedule would be able to make the informed decision of joining the second schedule since it has less congestion than the first one.

This disclosure provides multiple approaches for including additional information about a restricted TWT schedule in the restricted TWT advertisement by the restricted TWT scheduling AP (or more simply, the scheduling AP). For the embodiments discussed below it is understood that during the restricted TWT advertisement phase the scheduling AP sends to STAs in its BSS a Broadcast TWT element including a Broadcast TWT Parameter Set that corresponds to an advertised restricted TWT schedule (which, as discussed above, is a type of broadcast TWT schedule).

According to one embodiment, the additional information about a restricted TWT schedule can be conveyed in a Restricted TWT Additional Info field in a Restricted TWT Parameter Set field (i.e., a Broadcast TWT Parameter Set field corresponding to the restricted TWT schedule) in a Broadcast TWT element.

FIG. 3A illustrates an example format of a Restricted TWT Parameter Set field including the Restricted TWT Additional Info subfield according to various embodiments of the present disclosure. Varieties of additional information can be conveyed in the Restricted TWT Additional Info subfield in the Restricted TWT Parameter Set field. For instance, it can contain information on STA congestion level or maximum STA membership threshold.

FIG. 3B illustrates an example format of the Restricted TWT Additional Info field in the Restricted TWT Parameter Set field of FIG. 3A according to various embodiments of the present disclosure. The STA Congestion Info subfield in the Restricted TWT Additional Info field is an integer of length 1 octet and indicates the number of restricted TWT scheduled STAs that have active membership of the restricted TWT schedule corresponding to the Restricted TWT Parameter Set. The STA Congestion Threshold Info subfield in the Restricted TWT Additional Info field is 1 octet long and specifies the maximum number of STAs that the restricted TWT scheduling AP will allow to obtain membership of the corresponding restricted TWT schedule.

FIG. 3C illustrates an alternative example format of the Restricted TWT Additional Info field in the Restricted TWT Parameter Set field according to various embodiments of the present disclosure. According to this embodiment, the Restricted TWT Additional Info field format may only contain the STA Congestion Info subfield, which functions the same as the STA Congestion Info subfield of FIG. 3B. In such a case, the length of the Restricted TWT Additional Info field in FIG. 3A would be 1 octet.

FIG. 3D illustrates another alternative example format of the Restricted TWT Additional Info field in the Restricted TWT Parameter Set field according to various embodiments of the present disclosure. According to this embodiment, the Restricted TWT Additional Info field format may only contain the STA Congestion Threshold Info subfield, which functions the same as the STA Congestion Threshold Info subfield of FIG. 3B. In such a case, the length of the Restricted TWT Additional Info field in FIG. 3A would be 1 octet.

According to one embodiment, the presence of the Restricted TWT Additional Info field in the Restricted TWT Parameter Set field can be indicated by a Restricted TWT Additional Info Present subfield in the Broadcast TWT Info subfield in the Restricted TWT Parameter Set field of FIG. 3A.

Figure 3E:
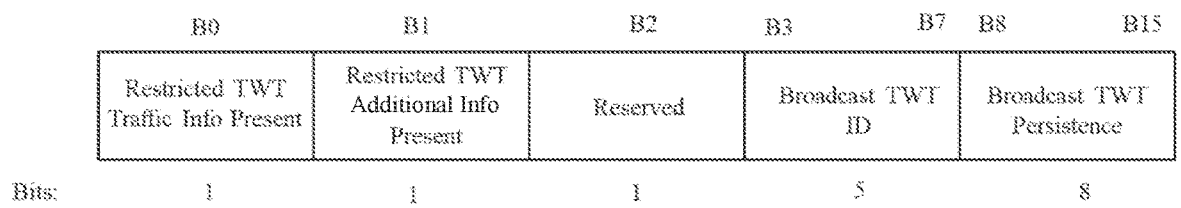
FIG. 3E illustrates an example Broadcast TWT Info subfield format including the Restricted TWT Additional Info Present subfield according to various embodiments of the present disclosure.

FIG. 3E illustrates an example Broadcast TWT Info subfield format including the Restricted TWT Additional Info Present subfield according to various embodiments of the present disclosure. According to this embodiment, if the Restricted TWT Additional Info Present subfield in the Broadcast TWT Info subfield in the Restricted TWT Parameter Set field is set to 1, it would indicate that the Restricted TWT Additional Info subfield containing the additional information on the restricted TWT schedule is present in the Restricted TWT Parameter Set field corresponding to the restricted TWT schedule. Otherwise, the Restricted TWT Additional Info subfield is not present in the Restricted TWT Parameter Set field. According to another embodiment, the Restricted TWT Additional Info Present subfield in FIG. 3E could be indicated by bit 2 (B2) of the Broadcast TWT Info subfield instead of bit 1 (B1). According to this embodiment, bit 1 (B1) would be Reserved.

According to another embodiment, the presence of the Restricted TWT Additional Info field in the Restricted TWT Parameter Set field can be indicated by an rTWT Additional Info Present subfield in the Request Type field in the Restricted TWT Parameter Set field of FIG. 3A.

Figure 3F:
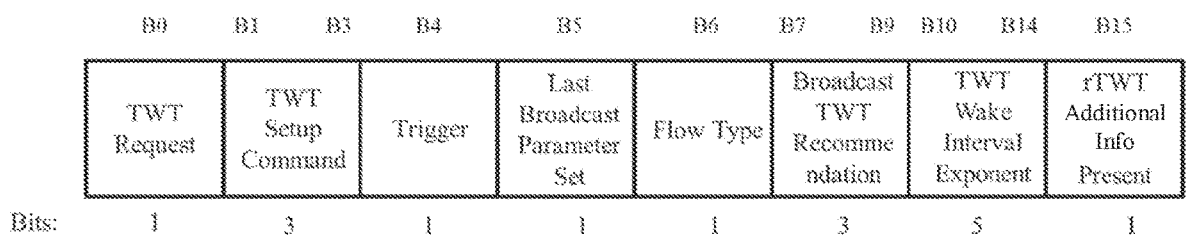
FIG. 3F illustrates an example Request Type field format including the rTWT Additional Info Present subfield according to various embodiments of the present disclosure.

FIG. 3F illustrates an example Request Type field format including the rTWT Additional Info Present subfield according to various embodiments of the present disclosure. According to this embodiment, if the rTWT Additional Info Present subfield in the Request Type field in the Restricted TWT Parameter Set field is set to 1, it would indicate that the Restricted TWT Additional Info subfield containing the additional information on the restricted TWT schedule is present in the Restricted TWT Parameter Set field corresponding to the restricted TWT schedule. Otherwise, the Restricted TWT Additional Info subfield is not present in the Restricted TWT Parameter Set field.

According to various other embodiments, the additional information about the restricted TWT schedule can be conveyed in a Restricted TWT Enhanced Info field in the corresponding Restricted TWT Parameter Set field (i.e., a Broadcast TWT Parameter Set field corresponding to the restricted TWT schedule) in the Broadcast TWT element.

FIG. 4A illustrates an example Restricted TWT Parameter Set field format including the Restricted TWT Enhanced Info field according to various embodiments of the present disclosure.

FIG. 4B illustrates an example Restricted TWT Enhanced Info field format in the Restricted TWT Parameter Set field of FIG. 4A according to various embodiments of the present disclosure. The Length subfield in the Restricted TWT Enhanced Info field indicates the length of the Restricted TWT Enhanced Info field. The rTWT Enhanced Info Control subfield indicates the presence of different information fields in the rTWT Enhanced Info subfield.

FIG. 4C illustrates an example rTWT Enhanced Info Control subfield format in the Restricted TWT Enhanced Info field in the Restricted TWT Parameter Set field according to various embodiments of the present disclosure.

The Congestion Info Present subfield in the rTWT Enhanced Info Control subfield is set to 1 if the Congestion Info field is present in the Restricted TWT Enhanced Info field in the Restricted TWT Parameter Set field. Otherwise, it is set to 0.

The Delay Info Present subfield in the rTWT Enhanced Info Control subfield is set to 1 if the Delay Info is present in the Restricted TWT Enhanced Info field in the Restricted TWT Parameter Set field. Otherwise, it is set to 0.

The Mean Data Rate Info Present subfield in the rTWT Enhanced Info Control subfield is set to 1 if the Mean Data Rate Info subfield is present in the Restricted TWT Enhanced Info field in the Restricted TWT Parameter Set field. Otherwise, it is set to 0.

The Peak Data Rate Info Present subfield in the rTWT Enhanced Info Control subfield is set to 1 if the Peak Data Rate Info subfield is present in the Restricted TWT Enhanced Info field in the Restricted TWT Parameter Set field. Otherwise, it is set to 0.

The Burst Size Info Present subfield in the rTWT Enhanced Info Control subfield is set to 1 if the Burst Size Info subfield is present in the Restricted TWT Enhanced Info field in the Restricted TWT Parameter Set field. Otherwise, it is set to 0.

The Minimum PHY Rate Info Present subfield in the rTWT Enhanced Info Control subfield is set to 1 if the Minimum PHY Rate Info subfield is present in the Restricted TWT Enhanced Info field in the Restricted TWT Parameter Set field. Otherwise, it is set to 0.

The Congestion Threshold Info Present subfield in the rTWT Enhanced Info Control subfield is set to 1 if the Congestion Threshold Info subfield is present in the Restricted TWT Enhanced Info field in the Restricted TWT Parameter Set field. Otherwise, it is set to 0.

Variations of the format of the rTWT Enhanced Info Control subfield as shown in FIG. 4C are also possible. Such variations can be made by removing one or more of the fields in the format as shown in FIG. 4C or by adding new fields.

FIG. 4D illustrates an example rTWT Enhanced Info subfield format in the Restricted TWT Enhanced Info field in the Restricted TWT Parameter Set field according to various embodiments of the present disclosure. The rTWT Enhanced Info subfield contains information corresponding to the Restricted TWT Parameter Set.

The Congestion Info subfield, if present in the rTWT Enhanced Info subfield, is an integer of length 1 octet and indicates the number of restricted TWT scheduled STAs that have active membership of the restricted TWT schedule corresponding to the Restricted TWT Parameter Set.

The Delay Info subfield, if present in the rTWT Enhanced Info subfield, is 4 octets long and contains an unsigned integer specifying the maximum amount of time, in microseconds, that it would take to transport a media access control (MAC) service data unit (MSDU) or aggregate MSDU (A-MSDU). This time is measured from the time instant marking the arrival of the MSDU—or the first MSDU of a series of MSDUs that constitute an A-MSDU—at the MAC service access point (SAP) to the time instant marking the completion of the successful transmission or re-transmission of the MSDU or A-MSDU at the destination.

The Mean Data Rate Info subfield, if present in the rTWT Enhanced Info subfield, is 4 octets long and indicates the average data rate, in units of bits per second, specified at the MAC SAP for transporting MSDUs or A-MSDUs.

The Peak Data Rate Info subfield, if present in the rTWT Enhanced Info subfield, is 4 octets long and indicates the maximum allowable data rate, in units of bits per second, specified at the MAC SAP for transporting MSDUs or A-MSDUs.

The Burst Size Info subfield, if present in the rTWT Enhanced Info subfield, is a 4 octet long unsigned integer and specifies the maximum burst, in octets, of the MSDUs or A-MSDUs at the MAC SAP at the peak data rate.

The Minimum PHY Rate Info subfield, if present in the rTWT Enhanced Info subfield, is 4 octets long, and specifies the minimum physical layer (PHY) rate for transporting MSDUs or A-MSDUs.

The Delay Info, Mean Data Rate Info, Peak Data Rate Info, and Burst Size Info subfields express the QoS expectation or assurance by the restricted TWT scheduling AP for the traffic for the corresponding restricted TWT schedule. Such schedule-level QoS information can be helpful for the restricted TWT scheduled STA for comparing different restricted TWT schedules among the available schedules being advertised. Based on such QoS information, the restricted TWT scheduled STA can elect to join a schedule that fulfills the STA's QoS requirement or expectation.

The Congestion Threshold Info subfield, if present in the rTWT Enhanced Info subfield, is 1 octet long, and specifies the maximum number of STAs that the restricted TWT scheduling AP will allow to obtain membership of the corresponding restricted TWT schedule.

Not all of the subfields as shown in FIGS. 4C and 4D need to be present as additional information for the corresponding restricted TWT schedule. It is possible that only a subset of the fields is present. Any partial additional information can still be helpful for the STA that intends to establish a restricted TWT schedule with its associated AP. The additional information is advertised so that the scheduled STA can choose the best schedules among the available restricted TWT schedules that fit the traffic pattern of the restricted TWT scheduled STA. If one or more pieces of additional information such as Delay Info, Mean Data Rate Info, etc. don't meet the scheduled STA's QoS expectation, the scheduled STA can still request membership of the restricted TWT schedule if there is no other better alternative schedule available that matches the scheduled STA's latency-sensitive traffic pattern.

According to one embodiment, the presence of the Restricted TWT Enhanced Info field in the Restricted TWT Parameter Set field of FIG. 4A can be indicated by the Restricted TWT Enhanced Info Present subfield in the Broadcast TWT Info subfield in the Restricted TWT Parameter Set field.

FIG. 4E illustrates an example Broadcast TWT Info subfield format including a Restricted TWT Enhanced Info Present subfield according to various embodiments of the present disclosure. According to this embodiment, if the Restricted TWT Enhanced Info Present subfield in the Broadcast TWT Info subfield in the Restricted TWT Parameter Set field is set to 1, it would indicate that the Restricted TWT Enhanced Info subfield containing the additional information on the restricted TWT schedule is present in the Restricted TWT Parameter Set field corresponding to the restricted TWT schedule. Otherwise, the Restricted TWT Enhanced Info subfield is not present in the Restricted TWT Parameter Set field. According to another embodiment, the Restricted TWT Enhanced Info Present subfield in FIG. 4E could be indicated by bit 2 (B2) of the Broadcast TWT Info subfield. According to this embodiment, bit 1 (B1) would be reserved.

According to another embodiment, the presence of the Restricted TWT Enhanced Info field in the Restricted TWT Parameter Set field of FIG. 4A can be indicated by the rTWT Enhanced Info Present subfield in the Request Type field in the Restricted TWT Parameter Set field.

FIG. 4F illustrates an example Request Type field format including an rTWT Enhanced Info Present subfield according to various embodiments of the present disclosure. According to this embodiment, if the rTWT Enhanced Info Present subfield in the Request Type field in the Restricted TWT Parameter Set field is set to 1, it would indicate that the Restricted TWT Enhanced Info subfield containing the additional information on the restricted TWT schedule is present in the Restricted TWT Parameter Set field corresponding to the restricted TWT schedule. Otherwise, the Restricted TWT Enhanced Info subfield is not present in the Restricted TWT Parameter Set field.

Figure 5:
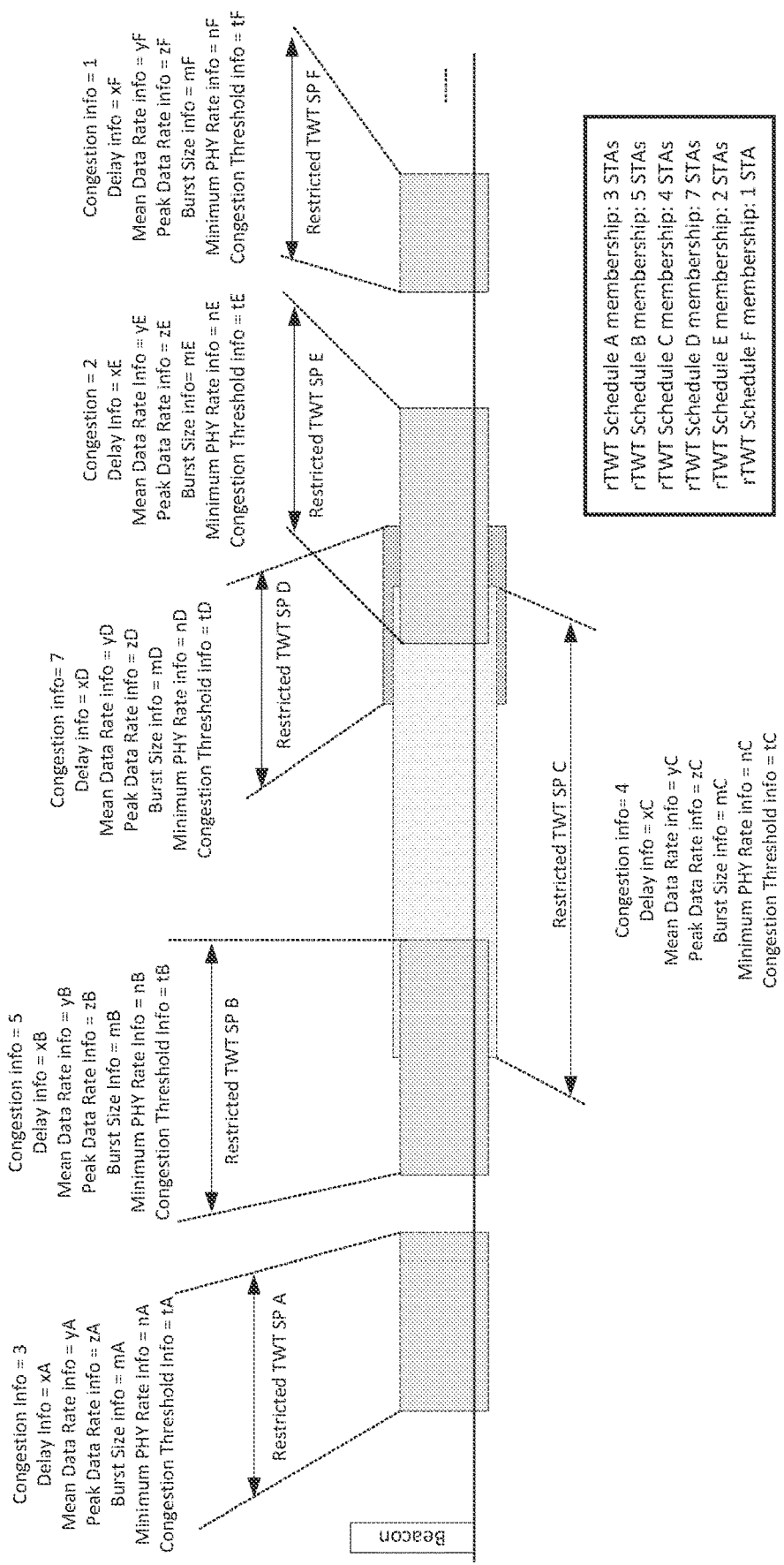
FIG. 5 illustrates an example of sharing of additional information about restricted TWT schedules by the restricted TWT scheduling AP during the restricted TWT advertisement phase according to various embodiments of the present disclosure.

FIG. 5 illustrates an example of sharing of additional information about restricted TWT schedules by the restricted TWT scheduling AP during the restricted TWT advertisement phase according to various embodiments of the present disclosure. In this example, the restricted TWT scheduling AP advertises 6 restricted TWT schedules—Restricted TWT Schedule A, Restricted TWT Schedule B, Restricted TWT Schedule C, Restricted TWT Schedule D, Restricted TWT Schedule E, and Restricted TWT Schedule F. In addition to the list of information that is included for each restricted TWT schedule as defined in the 802.11ax standards, the restricted TWT scheduling AP also includes additional information such as Congestion Info, Delay Info, Mean Data Rate Info, Peak Data Rate Info, Burst Size Info, Minimum PHY Rate Info, and Congestion Threshold Info.

Upon receiving the advertisement from the restricted TWT scheduling AP containing the restricted TWT schedules with such additional information, a STA that intends to establish a restricted TWT schedule may make a better informed decision as to which advertised restricted TWT schedule to join, as compared to a decision that could be made without the additional information. For example, the STA may want to join the restricted TWT schedule that fulfills the STA's low-latency traffic requirements, including lower congestion level, lower delay, etc.

Figure 6:
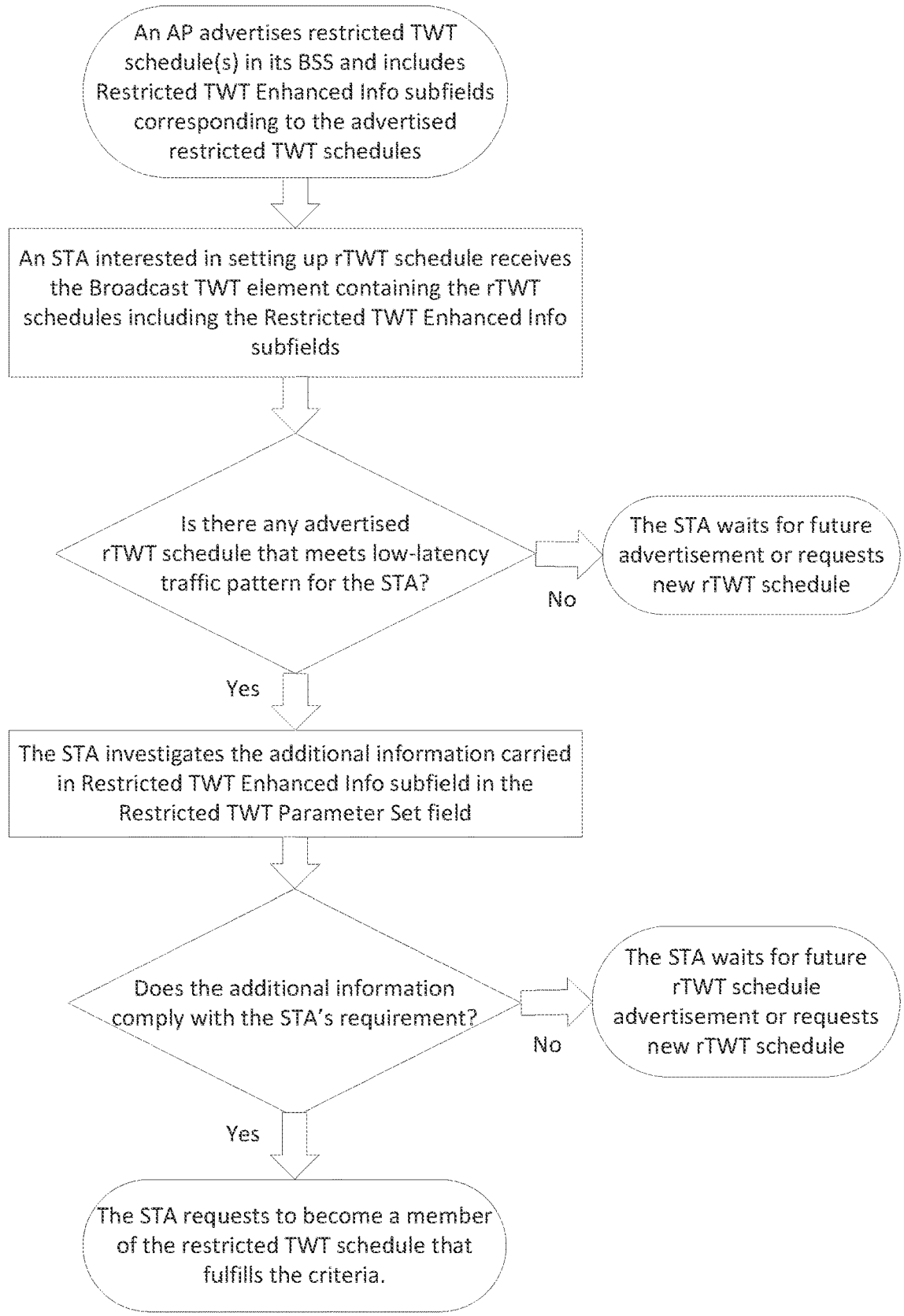
FIG. 6 illustrates an example decision-making process of a STA for determining a restricted TWT schedule to join based on additional information included in the restricted TWT advertisement according to various embodiments of the present disclosure.

FIG. 6 illustrates an example decision-making process of a STA for determining a restricted TWT schedule to join based on additional information included in the restricted TWT advertisement according to various embodiments of the present disclosure. In this example, the additional information is Restricted TWT Enhanced Info. The example process of FIG. 6 may be based on additional information received during the restricted TWT advertisement phase of FIG. 5.

According to one embodiment, the Restricted TWT Enhanced Info subfield in the Restricted TWT Parameter Set field is present only when the AP advertises the restricted TWT schedule corresponding to the Restricted TWT Parameter Set field. According to this embodiment, the Restricted TWT Enhanced Info subfield in the Restricted TWT Parameter Set field is present only when a Negotiation Type subfield in the control field of the Broadcast TWT element carrying the Restricted TWT Parameter Set is set to 2.

According to another embodiment, the Restricted TWT Enhanced Info subfield in the Restricted TWT Parameter Set field is present regardless of whether or not the restricted TWT scheduling AP is in the advertising phase. According to this embodiment, the Restricted TWT Enhanced Info subfield in the Restricted TWT Parameter Set field is present either when the Negotiation Type subfield in control field of the Broadcast TWT element carrying the Restricted TWT Parameter Set is set to 2 or 3.

When advertising the restricted TWT schedules, the restricted TWT scheduling AP does not currently include any information about the occupancy level of the restricted TWT schedules at different time slots between beacons. Here, the "occupancy level" at a time slot refers to the number of STAs that have active restricted TWT SPs on that particular time slot. Such information can be helpful to a restricted TWT scheduled STA in making a prudent decision as to how to request to join membership of a restricted TWT schedule. For instance, if the restricted TWT scheduled STA knows which time slots are highly congested (i.e., time slots for which a large number of scheduled STAs have active restricted TWT SPs that overlap with that particular time slot), the restricted TWT scheduled STA, when requesting to join the membership of a new restricted TWT schedule, can avoid those time slots. This would improve the STA's latency-sensitive traffic flow.

According to one embodiment, when advertising restricted TWT schedules, the restricted TWT scheduling AP can share additional information about the time slots. Such information about the time slots can include congestion level (i.e., how many STAs have an active restricted TWT SP that overlap with the time slot), the number of restricted TWT schedules that overlap with the time slot, and the threshold for the maximum number of STAs for that time slot (i.e., the maximum number of STAs the restricted TWT scheduling AP will allow to establish restricted TWT schedules that overlap with the time slot).

Figure 7:
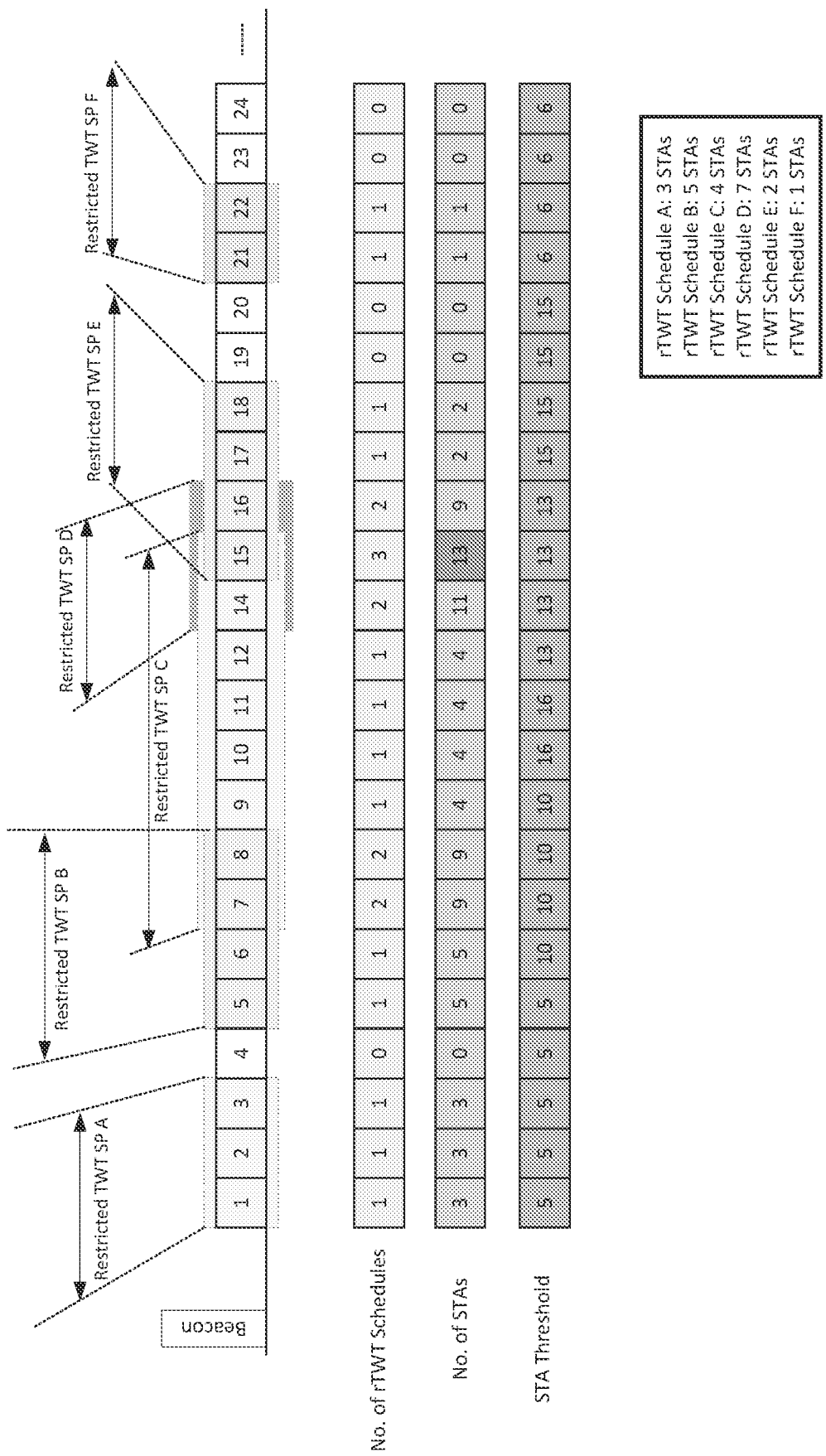
FIG. 7 illustrates an example of time slot-level information sharing by the restricted TWT scheduling AP during restricted TWT advertisement according to various embodiments of the present disclosure.

FIG. 7 illustrates an example of time slot-level information sharing by the restricted TWT scheduling AP during restricted TWT advertisement according to various embodiments of the present disclosure. In this example, the restricted TWT scheduling AP, during the advertisement phase, provides additional information about the time slots between two beacon arrivals. To be specific, the restricted TWT scheduling AP advertises information about 24 time slots, from Slot 1 to Slot 24.

For each time slot, the restricted TWT scheduling AP provides information about the number of restricted TWT scheduled STAs that have active restricted TWT SPs that overlap with that time slot, the number of restricted TWT schedules that overlap with that time slot, and the maximum number of STAs the restricted TWT scheduling AP will allow to establish restricted TWT schedules that overlap with that time slot. For instance, for time slot 15, the number of restricted TWT schedules that overlap with slot 15 is 3; these schedules are restricted TWT schedule C, restricted TWT schedule D, and restricted TWT schedule E. The number of restricted TWT scheduled STAs that obtained membership of the restricted TWT schedule C is 4, the number of restricted TWT scheduled STAs that obtained membership of the restricted TWT schedule D is 7, and the number of restricted TWT scheduled STAs that obtained membership of the restricted TWT schedule E is 2. Therefore, the total number of STAs that have active restricted TWT SPs overlapping slot 15 is (4+7+2)=13. For time slot 15, the threshold for the maximum number of STAs is 13. Since there are already 13 restricted TWT scheduled STAs that have restricted TWT schedules that overlap with slot 15, the restricted TWT scheduling AP will not accommodate any new restricted TWT schedule request that overlaps with slot 15. That is, slot 15 has reached it maximum occupancy threshold.

According to one embodiment, occupancy information about a restricted TWT schedule can also be expressed in terms of whether or not the restricted TWT schedule is full. Here, a restricted TWT schedule is considered "full" when the corresponding restricted TWT scheduling AP will not allow any new STA in the BSS to obtain membership of the restricted TWT schedule. By observing such information advertised about a restricted TWT schedule, a STA may refrain from requesting membership of a full restricted TWT schedule.

According to one embodiment, whether or not a restricted TWT schedule is full can be indicated by a Restricted TWT Schedule Full subfield in the Broadcast TWT Info subfield in a Restricted TWT Parameter Set field corresponding to the restricted TWT schedule.

FIG. 8A illustrates an example Broadcast TWT Info subfield format including a Restricted TWT Schedule Full subfield according to various embodiments of the present disclosure. If the Restricted TWT Schedule Full subfield is set to 1, it would indicate that the corresponding restricted TWT schedule is full—i.e., the restricted TWT scheduling AP is unlikely to accept a request from a STA in the BSS to establish membership in the corresponding restricted TWT schedule. Otherwise, the corresponding restricted TWT schedule is not full.

FIG. 8B illustrates another example Broadcast TWT Info subfield format including a Restricted TWT Schedule Full subfield according to various embodiments of the present disclosure. This embodiment is similar to that of FIG. 8A, except that the Restricted TWT Schedule Full subfield is represented by bit 2 (B2). In this embodiment, bit 1 (B1) is Reserved.

In some embodiments of FIGS. 8A and 8B, the Restricted TWT Schedule Full subfield is valid when the corresponding restricted TWT Parameter Set field is carried in a Broadcast TWT element with Negotiation Type subfield set to 2, and the Broadcast TWT element is transmitted by an extremely high throughput (EHT) AP that sets a Restricted TWT Support subfield in an EHT Capabilities element set to 1 (i.e., an EHT AP with a dot11RestrictedTWTOptionImplemented value set to true). Otherwise, the subfield is reserved. This subfield can be ignored if the Negotiation Type subfield in the corresponding Restricted TWT Parameter Set field in the Broadcast TWT element is set to 3.

According to one embodiment, a restricted TWT scheduling AP, while advertising a restricted TWT schedule (i.e., with Negotiation Type subfield set to 2), shall indicate whether or not the schedule is available for accommodating any new membership. If the Restricted TWT Schedule Full subfield in the Broadcast TWT Info subfield in a Restricted TWT Parameter Set field is set to 1, it indicates that the corresponding restricted TWT schedule is not available for accommodating any new membership. Otherwise, it is available for new membership.

According to one embodiment, a STA should not request to establish membership in a restricted TWT schedule advertised by the restricted TWT scheduling AP with the Restricted TWT Schedule Full subfield set to 1 (i.e., if the Restricted TWT Schedule Full subfield in the Broadcast TWT Info subfield in the Restricted TWT Parameter Set field corresponding to the announced restricted TWT schedule is set to 1). According to one embodiment, a restricted TWT scheduling AP does not allow any new STA in the BSS to obtain membership of any full restricted TWT schedule.

According to some embodiments, whether or not a restricted TWT schedule is full can be indicated by an rTWT Schedule Full subfield in the Request Type field in the Restricted TWT Parameter Set field corresponding to the restricted TWT schedule.

FIG. 9 illustrates an example Request Type field format including an rTWT Schedule Full subfield according to various embodiments of the present disclosure. If the rTWT Schedule Full subfield is set to 1, it would indicate that the corresponding restricted TWT schedule is full. Otherwise, it would indicate that the corresponding restricted TWT schedule is not full.

In some embodiments, the rTWT Schedule Full subfield is valid when it is transmitted by an EHT AP that sets the Restricted TWT Support subfield in the EHT Capabilities element to 1, and is reserved otherwise. The rTWT Schedule Full subfield can be ignored if the Negotiation Type subfield in the corresponding Restricted TWT Parameter Set field in the Broadcast TWT element is set to 3.

According to one embodiment, a restricted TWT scheduling AP, while advertising a restricted TWT schedule (i.e., with Negotiation Type subfield set to 2), shall indicate whether or not the schedule is available for accommodating any new membership. If the rTWT Schedule Full subfield in the Request Type field in a Restricted TWT Parameter Set field is set to 1, it indicates that the corresponding restricted TWT schedule is not available for accommodating any new membership. Otherwise, it is available for new membership.

According to one embodiment, a STA should not request to establish membership for a restricted TWT schedule if the rTWT Schedule Full subfield in the Request Type field in the Restricted TWT Parameter Set field corresponding to the announced restricted TWT schedule is set to 1. According to one embodiment, a restricted TWT scheduling AP does not allow any new STA in the BSS to obtain membership of any full restricted TWT schedule (e.g., the restricted TWT scheduling AP will reject any request to obtain membership of any full restricted TWT schedule).

According to yet another embodiment, whether or not a restricted TWT schedule is full can be indicated in the Broadcast TWT Recommendation subfield in the Request Type field in the Restricted TWT Parameter Set corresponding to the restricted TWT schedule. Table 1 illustrates values of a Broadcast TWT Recommendation field in the Request Type field in a Broadcast TWT Parameter Set. According to one embodiment, an indication of whether or not a restricted TWT schedule is full can be made by using the value 5 in the Broadcast TWT Recommendation field. According to another embodiment, such an indication can be made by using the value 6 or value 7 in the Broadcast TWT Recommendation field.

TABLE 1

| Broadcast TWT Recommendation field value | Description when transmitted in a broadcast TWT element |
|---|---|
| 0 | No constraints on the frames transmitted during a broadcast TWT SP |
| 1 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) Feedback in an HE TB feedback NDP, if solicited by the AP (see 26.5.7 (NDP feedback report procedure)) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action or Action No Ack frames Control response frames Trigger frames transmitted by the TWT scheduling AP during the broadcast TWT SP do not contain RUs for random access (see 26.8.3.2 (Rules for TWT scheduling AP) and 26.5.4 (UL OFDMA-based random access (UORA))), otherwise, there are no other restrictions on the frames transmitted by the TWT scheduling AP. |
| 2 | Frames transmitted during a broadcast TWT SP by a TWT scheduled STA are recommended to be limited to solicited status and solicited feedback: PS-Poll and QoS Null frames Feedback can be contained in the QoS Control field or in the HE variant HT Control field of the frame, if either is present (see 26.5.2 (UL MU operation), 26.9 (Operating mode indication), 26.13 (Link adaptation using the HLA Control subfield), etc.) BQRs (see 26.5.6 (Bandwidth query report operation)) BSRs (see 26.5.5 (Buffer status report operation)) Frames that are sent as part of a sounding feedback exchange (see 26.7 (HE sounding protocol)) Management frames: Action, Action No Ack frames or (Re)Association Request Control response frames Trigger frames transmitted by the TWT scheduling AP during the broadcast TWT SP contain |

TABLE 1-continued

| Broadcast TWT Recommendation field value | Description when transmitted in a broadcast TWT element |
|---|---|
| | at least one RU for random access (see 26.8.3.2 (Rules for TWT scheduling AP) and 26.5.4 (UL OFDMA-based random access (UORA))), otherwise there are no restrictions on the frames transmitted by the TWT scheduling AP. |
| 3 | No constraints on the frames transmitted during a broadcast TWT SP except that the AP transmits a TIM frame or a FILS Discovery frame including a TIM element at the beginning of each TWT SP (see 26.14.3.2 (AP operation for opportunistic power save)). |
| 4 | The corresponding broadcast TWT service period is referred to as a restricted TWT service period. A broadcast TWT parameter set that has the Broadcast TWT Recommendation field equal to 4 is referred to as a restricted TWT parameter set. |
| 5 | The corresponding broadcast TWT service period is referred to as a restricted TWT service period. The corresponding restricted TWT schedule is full. A broadcast TWT parameter set that has the Broadcast TWT Recommendation field equal to 5 is also referred to as a restricted TWT parameter set. |
| 6-7 | Reserved |

According to one embodiment, if a restricted TWT scheduling AP indicates that a restricted TWT schedule is full, the restricted TWT scheduling AP shall not allow any STA to obtain any new membership of the corresponding restricted TWT schedule (e.g., the restricted TWT scheduling AP shall reject any request to obtain membership of the corresponding restricted TWT schedule). According to other embodiments, even if a restricted TWT scheduling AP indicates that a restricted TWT schedule is full, the restricted TWT scheduling AP may still allow STAs to obtain new membership of the restricted TWT schedule.

According to one embodiment, a restricted TWT scheduling AP, while advertising a restricted TWT schedule (i.e., with Negotiation Type subfield set to 2), shall indicate whether or not the schedule is available for accommodating any new membership. If the restricted TWT scheduling AP advertises that the restricted TWT schedule is not available for accommodating any new membership, then a STA should not request to establish membership for the restricted TWT schedule.

According to one embodiment, whether or not a restricted TWT schedule is empty is indicated by a Restricted TWT Schedule Empty subfield in the Broadcast TWT Info subfield in the corresponding Restricted TWT Parameter Set field. Here, an "empty" restricted TWT schedule refers to a schedule advertised by the restricted TWT scheduling AP in which no STA has yet obtained membership.

Figure 10:
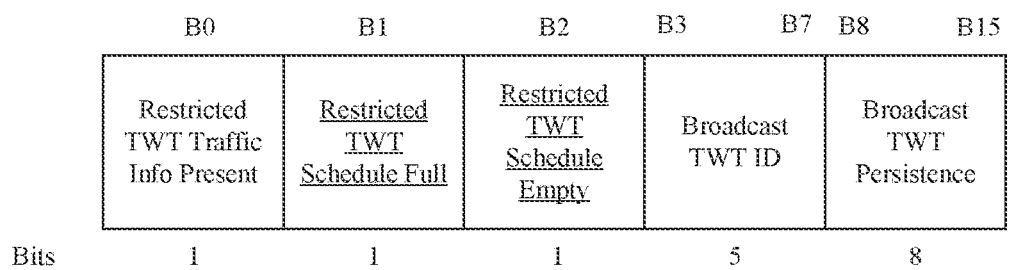
FIG. 10 illustrates an example Broadcast TWT Info subfield format including both Restricted TWT Schedule Full and Restricted TWT Schedule Empty subfields according to various embodiments of the present disclosure.

FIG. 10 illustrates an example Broadcast TWT Info subfield format including both Restricted TWT Schedule Full and Restricted TWT Schedule Empty subfields according to various embodiments of the present disclosure. If the Restricted TWT Schedule Empty subfield is set to 1, it would indicate that the corresponding restricted TWT schedule is empty. Otherwise, the schedule is not empty. According to another embodiment, the positions of the Restricted TWT Schedule Full and Restricted TWT Schedule Empty subfields are interchanged. Other naming of the subfields is also possible.

According to another embodiment, a Restricted TWT Schedule Info subfield is present in the Broadcast TWT Info subfield.

Figure 11:
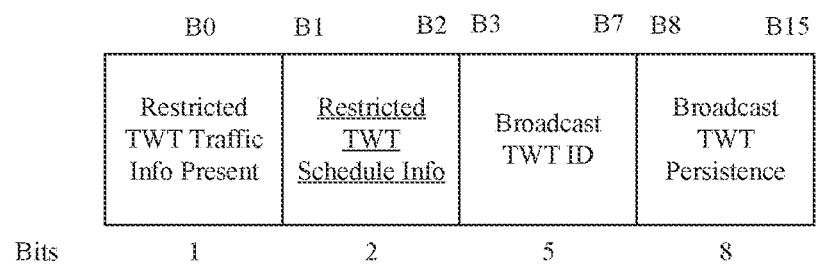
FIG. 11 illustrates an example Broadcast TWT Info subfield format including a Restricted TWT Schedule Info subfield according to various embodiments of the present disclosure.

FIG. 11 illustrates an example Broadcast TWT Info subfield format including a Restricted TWT Schedule Info subfield according to various embodiments of the present disclosure. One possible encoding of the Restricted TWT Schedule Info subfield is shown in Table 2. Variation of the order of the interpretation in Table 2 is also possible.

TABLE 2

| Value | Interpretation of the subfield |
|---|---|
| 1 | The corresponding restricted TWT schedule is full |
| 2 | The corresponding restricted TWT schedule is empty |
| 3 | Reserved |
| 4 | Reserved |

An alternative encoding of the Restricted TWT Schedule Info subfield is shown in Table 3.

TABLE 3

| Value | Interpretation of the subfield |
|---|---|
| 1 | The corresponding restricted TWT schedule is full |
| 2 | The corresponding restricted TWT schedule is empty |
| 3 | The corresponding restricted TWT schedule is from the neighboring BSS |
| 4 | Reserved |

According to one embodiment, whether or not a restricted TWT schedule is full or empty or from a neighboring BSS can be indicated by making new entries in a TWT setup command field valid for the Broadcast TWT announcement (i.e., with Negotiation Type subfield set to 2) and assigning the corresponding values applicable for full, empty, or neighbor BSS indication.

Another alternative encoding of the Restricted TWT Schedule Info subfield is shown in Table 4.

TABLE 4

| Value | Interpretation of the subfield |
|---|---|
| 0 | The corresponding restricted TWT schedule is full |
| 1 | The corresponding restricted TWT schedule is active. |
| 2 | The corresponding restricted TWT schedule is inactive. |
| 3 | The corresponding restricted TWT schedule is from the neighboring BSS (OBSS) |

According to one embodiment, the Restricted TWT Schedule Info subfield is valid when the corresponding restricted TWT Parameter Set field is carried in a TWT element with Negotiation Type subfield set to 2 (i.e., when the TWT element is a restricted TWT advertisement), and the TWT element is transmitted by an EHT AP with dot11RestrictedTWTOptionImplemented set to true (i.e., when the EHT AP sets the Restricted TWT Support subfield in the EHT Capabilities element to 1). Otherwise, the subfield is reserved.

According to one embodiment, in reference to Table 4, if the encoded value in the Restricted TWT Schedule Info subfield is set to 0, it indicates that the corresponding schedule is a full schedule and the restricted TWT scheduling AP is unlikely to accept a request from a STA in the BSS to establish a new membership in the corresponding schedule—i.e., that the corresponding restricted TWT schedule is not available for accommodating any new membership. A STA should not request to establish membership in a restricted TWT schedule advertised by the restricted TWT scheduling AP with the Restricted TWT Schedule Info subfield set to 0.

According to one embodiment, in reference to Table 4, if the encoded value in the Restricted TWT Schedule Info subfield is set to 1, it indicates that the corresponding schedule is an active schedule. An active schedule is a schedule for which at least one STA has obtained membership but that is not a full schedule.

According to one embodiment, in reference to Table 4, if the encoded value in the Restricted TWT Schedule Info subfield is set to 2, it indicates that the corresponding schedule is an inactive schedule. An inactive schedule is a schedule that is available for new membership but no STA has yet obtained membership in this schedule. According to one embodiment, the STAs in the BSS need not end their transmit opportunity (TXOP) before the start time (Target Wake Time) of such an inactive schedule. According to another embodiment, the restricted TWT scheduling AP does not send a Quiet element to create an overlapping quiet interval corresponding to an inactive schedule.

According to one embodiment, in reference to Table 4, if the encoded value in the Restricted TWT Schedule Info subfield is set to 3, it indicates that the corresponding schedule is created by a neighboring AP corresponding to a neighboring BSS.

According to one embodiment, a restricted TWT scheduling AP, while advertising a restricted TWT schedule (i.e., with Negotiation Type subfield set to 2), shall indicate whether the corresponding schedule is Full or Active or Inactive or from a neighboring BSS by setting the appropriate value in the Restricted TWT Schedule Info subfield.

Figure 12A:
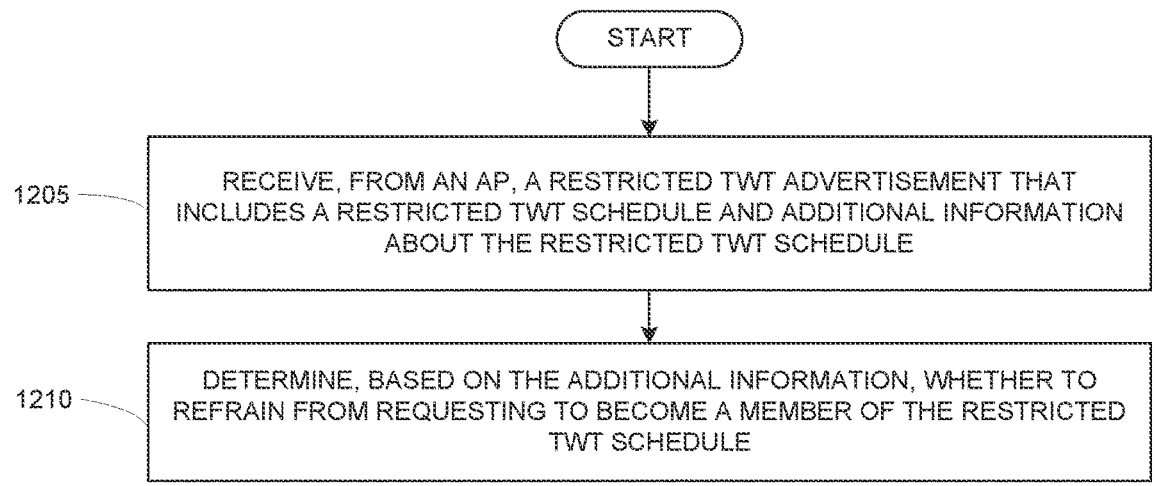
FIGS. 12A and 12B illustrate an example process for enhancing advertisement of restricted TWT schedules by scheduling APs and improving selection of restricted TWT schedules by scheduled STAs according to various embodiments of the present disclosure.
Figure 12B:
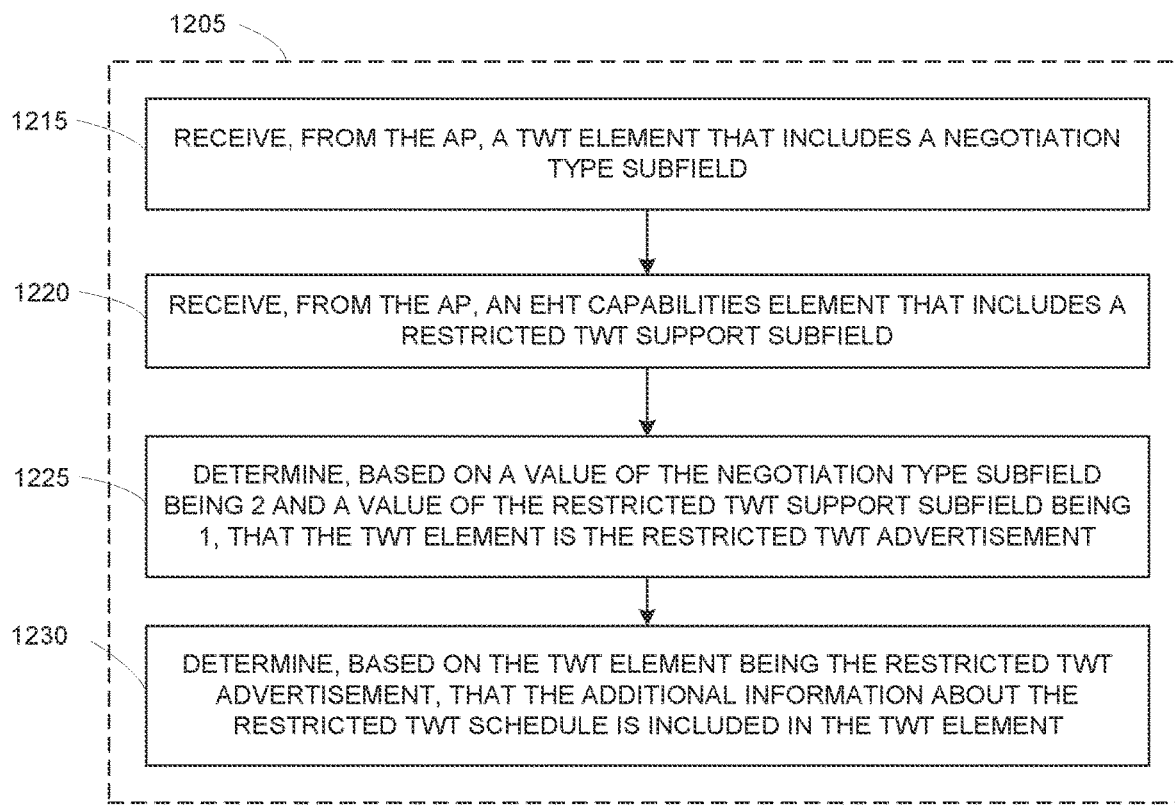

FIGS. 12A and 12B illustrate an example process for enhancing advertisement of restricted TWT schedules by scheduling APs and improving selection of restricted TWT schedules by scheduled STAs according to various embodiments of the present disclosure. The process of FIGS. 12A and 12B is discussed as being performed by a STA, but it is understood that an AP associated with the STA could perform a corresponding process. Additionally, for convenience, the process of FIGS. 12A and 12B is discussed as being performed by a WI-FI STA such as STA 111, but it is understood that any suitable wireless communication device could perform the process.

Referring now to FIG. 12A, beginning at step 1205 the STA receives, from an AP, a restricted TWT advertisement that includes a restricted TWT schedule and additional information about the restricted TWT schedule. The additional information about the restricted TWT schedule includes at least one of congestion information, delay information, mean data rate information, peak data rate information, burst size information, minimum physical layer (PHY) rate information, or congestion threshold information.

In one embodiment, the restricted TWT advertisement is a TWT element that includes a Restricted TWT Parameter Set field that corresponds to the restricted TWT schedule, and the additional information about the restricted TWT schedule is indicated by a subfield of a Broadcast TWT Info subfield of the Restricted TWT Parameter Set field that corresponds to the restricted TWT schedule. The subfield may comprise one or two bits. In one embodiment, the subfield comprises one bit, and is a Restricted TWT Schedule Full subfield.

The STA then determines, based on the additional information, whether to refrain from requesting to become a member of the restricted TWT schedule (step 1210). In some embodiments, the additional information about the restricted TWT schedule is an indication of whether the restricted TWT schedule is available to accommodate additional members, and the STA determines to refrain from requesting to become a member of the restricted TWT schedule based on the additional information indicating that the restricted TWT schedule is not available to accommodate additional members.

In one embodiment, when the additional information about the restricted TWT schedule is indicated by a Restricted TWT Schedule Full subfield the STA determines to refrain from requesting to become a member of the restricted TWT schedule based on the one bit of the Restricted TWT Schedule Full subfield having a value of 1.

Referring now to FIG. 12B, in some embodiments of step 1205 the STA receives, from the AP, a TWT element includes a Negotiation Type subfield (step 1215) and also receives, from the AP, an EHT Capabilities element that includes a Restricted TWT Support subfield (step 1220).

The STA then determines, based on a value of the Negotiation Type subfield being 2 and a value of the Restricted TWT Support subfield being 1, that the TWT element is the restricted TWT advertisement of step 1205 (step 1225).

The STA then determines, based on the TWT element being the restricted TWT advertisement, that the additional information about the restricted TWT schedule is included in the TWT element (step 1230). For example, the STA determines at step 1230 that a valid Restricted TWT Schedule Full subfield is included in the TWT element. At this point, the STA may perform step 1210 of FIG. 12A.

The above flowcharts illustrate example methods that can be implemented in accordance with the principles of the present disclosure and various changes could be made to the methods illustrated in the flowchart. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A station device associated with a wireless network, the station device comprising:
one or more memories; and
one or more processors coupled to the one or more memories, the one or more processors configured to cause:
receiving, from an access point (AP) device, an extremely high throughput (EHT) Capabilities element that includes a restricted TWT Support subfield, the restricted TWT Support subfield indicating whether the AP device supports restricted TWT operation,
receiving, from the AP device, a broadcast target wake time (TWT) element including a restricted TWT parameter set field that includes a restricted TWT schedule full subfield, and
determining whether to request to establish a new membership in a restricted TWT schedule advertised by the AP device based on the restricted TWT schedule full subfield,
wherein the restricted TWT schedule full subfield is valid when the restricted TWT Support subfield indicates that the AP device supports restricted TWT operation.

2. The station device of claim 1, wherein the restricted TWT schedule full subfield is in a broadcast TWT information subfield of the restricted TWT parameter set field.

3. The station device of claim 1, wherein the restricted TWT schedule full subfield indicates whether the restricted TWT schedule is available for accommodating any new membership.

4. The station device of claim 1, wherein if the restricted TWT schedule full subfield is set to a first value, the restricted TWT schedule full subfield indicates that the restricted TWT schedule is not available for accommodating any new membership.

5. The station device of claim 1, wherein if the restricted TWT schedule full subfield is set to a second value, the restricted TWT schedule full subfield indicates that the restricted TWT schedule is available for accommodating any new membership.

6. The station device of claim 1, wherein the one or more processors are further configured to cause:
refraining transmitting, to the AP device, a request to establish a new membership in the restricted TWT schedule advertised by the AP device when the restricted TWT schedule full subfield is set to a first value.

7. The station device of claim 1, wherein the one or more processors are further configured to cause:
transmitting, to the AP device, a request to establish a new membership in the restricted TWT schedule advertised by the AP device when the restricted TWT schedule full subfield is set to a second value.

8. The station device of claim 1, wherein:
the broadcast TWT element includes a negotiation type subfield, the negotiation type subfield indicating whether the broadcast TWT element provides a broadcast TWT schedule to one or more station devices, and
the restricted TWT schedule full subfield is valid when the negotiation type subfield indicates that the broadcast TWT element provides a broadcast TWT schedule to one or more station devices.

9. The station device of claim 1, wherein the restricted TWT schedule is advertised from the AP device by the restricted TWT parameter set field in the broadcast TWT element.

10. An access point (AP) device associated with a wireless network, the AP device comprising:
one or more memories; and
one or more processors coupled to the one or more memories, the one or more processors configured to cause:
transmitting, to one or more stations, an extremely high throughput (EHT) Capabilities element that includes a restricted TWT Support subfield, the restricted TWT Support subfield indicating whether the AP device supports restricted TWT operation,
generating a broadcast target wake time (TWT) element including a restricted TWT parameter set field that includes a restricted TWT schedule full subfield, and
transmitting, to one or more station devices, the broadcast TWT element to advertise a restricted TWT schedule,
wherein the restricted TWT schedule full subfield indicates whether the AP device allows a station device to obtain a new membership in the restricted TWT schedule,
wherein the restricted TWT schedule full subfield is valid when the restricted TWT Support subfield indicates that the AP device supports restricted TWT operation.

11. The AP device of claim 10, wherein the restricted TWT schedule full subfield is in a broadcast TWT information subfield of the restricted TWT parameter set field.

12. The AP device of claim 10, wherein the restricted TWT schedule full subfield indicates whether the restricted TWT schedule is available for accommodating any new membership.

13. The AP device of claim 10, wherein if the restricted TWT schedule full subfield is set to a first value, the restricted TWT schedule full subfield indicates that the restricted TWT schedule is not available for accommodating any new membership.

14. The AP device of claim 10, wherein if the restricted TWT schedule full subfield is set to a second value, the restricted TWT schedule full subfield indicates that the restricted TWT schedule is available for accommodating any new membership.

15. The AP device of claim 10, wherein the one or more processors are further configured to cause:
receiving, from a station device, a request to establish a new membership in the restricted TWT schedule advertised by the AP device
determining whether to accept membership of the restricted TWT schedule based on the restricted TWT schedule full subfield.

16. The AP device of claim 10, wherein:
the broadcast TWT element includes a negotiation type subfield, the negotiation type subfield indicating whether the broadcast TWT element provides a broadcast TWT schedule to one or more station devices, and the restricted TWT schedule full subfield is valid when the negotiation type subfield indicates that the broadcast TWT element provides a broadcast TWT schedule to one or more station devices.

17. A method for a station device associated with a wireless network, the method comprising:
   receiving, from an access point (AP) device, an extremely high throughput (EHT) Capabilities element that includes a restricted TWT Support subfield, the restricted TWT Support subfield indicating whether the AP device supports restricted TWT operation
   receiving, from the AP device, a broadcast target wake time (TWT) element including a restricted TWT parameter set field that includes a restricted TWT schedule full subfield, and
   determining whether to request to establish a new membership in a restricted TWT schedule advertised by the AP device based on the restricted TWT schedule full subfield,
   wherein the restricted TWT schedule full subfield is valid when the restricted TWT Support subfield indicates that the AP device supports restricted TWT operation.

18. The method of claim 17, wherein the restricted TWT schedule full subfield indicates whether the restricted TWT schedule is available for accommodating any new membership.

* * * * *